United States Patent
Meersma et al.

(10) Patent No.: US 12,148,067 B2
(45) Date of Patent: Nov. 19, 2024

(54) GRAPHICAL USER INTERFACE VISUAL ACCESSIBLITY VIOLATION DETECTION AND ALERTING

(71) Applicant: Microsoft Technology Licensing, LLC, Redmond, WA (US)

(72) Inventors: Brian Daniel Meersma, Princeton Junction, NJ (US); Omar Simon Francisco Prieto Chacon, Everett, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 17/743,916

(22) Filed: May 13, 2022

(65) Prior Publication Data

US 2023/0368434 A1    Nov. 16, 2023

(51) Int. Cl.
*G06T 11/00*    (2006.01)
*G06F 3/0481*    (2022.01)
*G06F 9/451*    (2018.01)

(52) U.S. Cl.
CPC .......... *G06T 11/001* (2013.01); *G06F 3/0481* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 9,262,385 B2* | 2/2016 | Ebner | G06F 40/143 |
| 10,275,339 B2* | 4/2019 | Vignesh R | G06F 11/3688 |
| 10,333,965 B2* | 6/2019 | Gathala | H04W 12/128 |
| 11,651,530 B2* | 5/2023 | Echevarria Vallespi | G06F 3/04847 345/594 |
| 2017/0295203 A1* | 10/2017 | Shapiro | G06F 21/31 |

FOREIGN PATENT DOCUMENTS

WO   WO-2021050766 A1 *  3/2021  ........... H04L 51/063

OTHER PUBLICATIONS

"G17: Ensuring that a Contrast Ratio of at Least 7:1 Exists Between Text (and Images of Text) and Background Behind the Text", Retrieved from: https://web.archive.org/web/20160531163630/http://www.w3.org/TR/WCAG20-TECHS/G17.html, May 31, 2016, 4 Pages.

* cited by examiner

*Primary Examiner* — Saptarshi Mazumder
(74) *Attorney, Agent, or Firm* — NovoTechIP International PLLC (57) ABSTRACT

A device for detecting a visual accessibility violation (VAV) is disclosed, which includes a processor and a computer-readable medium in communication with the processor, the computer-readable medium including instructions that, when executed by the processor, cause the processor to control the device to perform receiving, from a host, theming data indicating a color theme; rendering, based on the received theming data, a graphical user interface (GUI) at a client, the GUI including a first visual element having a first color; determining whether the first color selected for the first visual element causes a VAV with respect to a second color of a second visual element displayed on the GUI; and in response to determining that the first color causes the VAV, generating a first VAV report.

16 Claims, 8 Drawing Sheets

GRAPHICAL USER INTERFACE VISUAL ACCESSIBLITY VIOLATION DETECTION AND ALERTING

BACKGROUND

Recent advancement in communications and computer technologies has brought feature-rich communication and collaboration solutions, such as, text and media chats, teleconferences, online lectures and seminars, etc., which have been replacing traditional communication means, such as telephone calls, postal mails, etc. Some communication solutions provide access flexibility, including allowing users to participate in a real-time communication/collaboration sessions via various platforms, such as mobile platforms (e.g., Google™ Android™, Apple™ iOS™, etc.), operating systems (e.g., Microsoft™ Windows™, Apple™ MacOS™, Linux™, etc.), web-based applications, etc. As such, well-implemented communication/collaboration solutions can seamlessly work on many popular platforms, providing users with a freedom to initiate and participate in a communication/collaboration session via a platform of their choices. Also, some platforms offer certain freedom to change how the communication/collaboration session is visually presented to users. For example, some applications offer a function to change the background color of the GUI and render texts in a color having a high contrast ratio to the background color (e.g., white text on black background). Hence, two users may participate in the same communication/collaboration session with different visual themes, which may cause visibility issues unless various color choices for visual elements are assessed, tested and validated before such visual themes become available to users. However, such testing and validation can take a great deal of time and effort. As such, there still remain significant areas for new and improved implementations for promptly detecting and addressing visual accessibility issues.

SUMMARY

In an implementation, a device for detecting a visual accessibility violation (VAV) includes a processor and a computer-readable medium in communication with the processor, the computer-readable medium including instructions that, when executed by the processor, cause the processor to control the device to perform receiving, from a host, theming data indicating a color theme; rendering, based on the received theming data, a graphical user interface (GUI) at a client, the GUI including a first visual element having a first color; determining whether the first color selected for the first visual element causes a VAV with respect to a second color of a second visual element displayed on the GUI; and in response to determining that the first color causes the VAV, generating a first VAV report.

In another implementation, a method of operating a device for detecting a visual accessibility violation (VAV), includes receiving, from a host, theming data indicating a color theme; rendering, based on the received theming data, a graphical user interface (GUI) at a client, the GUI including a first visual element having a first color; determining whether the first color selected for the first visual element causes a VAV with respect to a second color of a second visual element displayed on the GUI; and in response to determining that the first color causes the VAV, generating a first VAV report.

In another implementation, a device includes a non-transitory computer-readable medium including instructions that, when executed by a processor, cause the processor to control a device to perform receiving, from a host, theming data indicating a color theme; rendering, based on the received theming data, a graphical user interface (GUI) at a client, the GUI including a first visual element having a first color; determining whether the first color selected for the first visual element causes a VAV with respect to a second color of a second visual element displayed on the GUI; and in response to determining that the first color causes the VAV, generating a first VAV report.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to identifying a visual accessibility violation (VAV) by a visual element displayed on a graphical user interface (GUI) and generating an alert when such VAV meets a predetermined condition. Since such VAV can be identified in real time, developers can promptly address the issues before a significant number of communication/collaboration sessions (CCSs) are affected by such violation. Hence, this description provides a technical solution to a technical problem that developers have to manually check and validate each and every visual theme to determine whether any of available visual themes are susceptible to a VAV.

Figure 1:
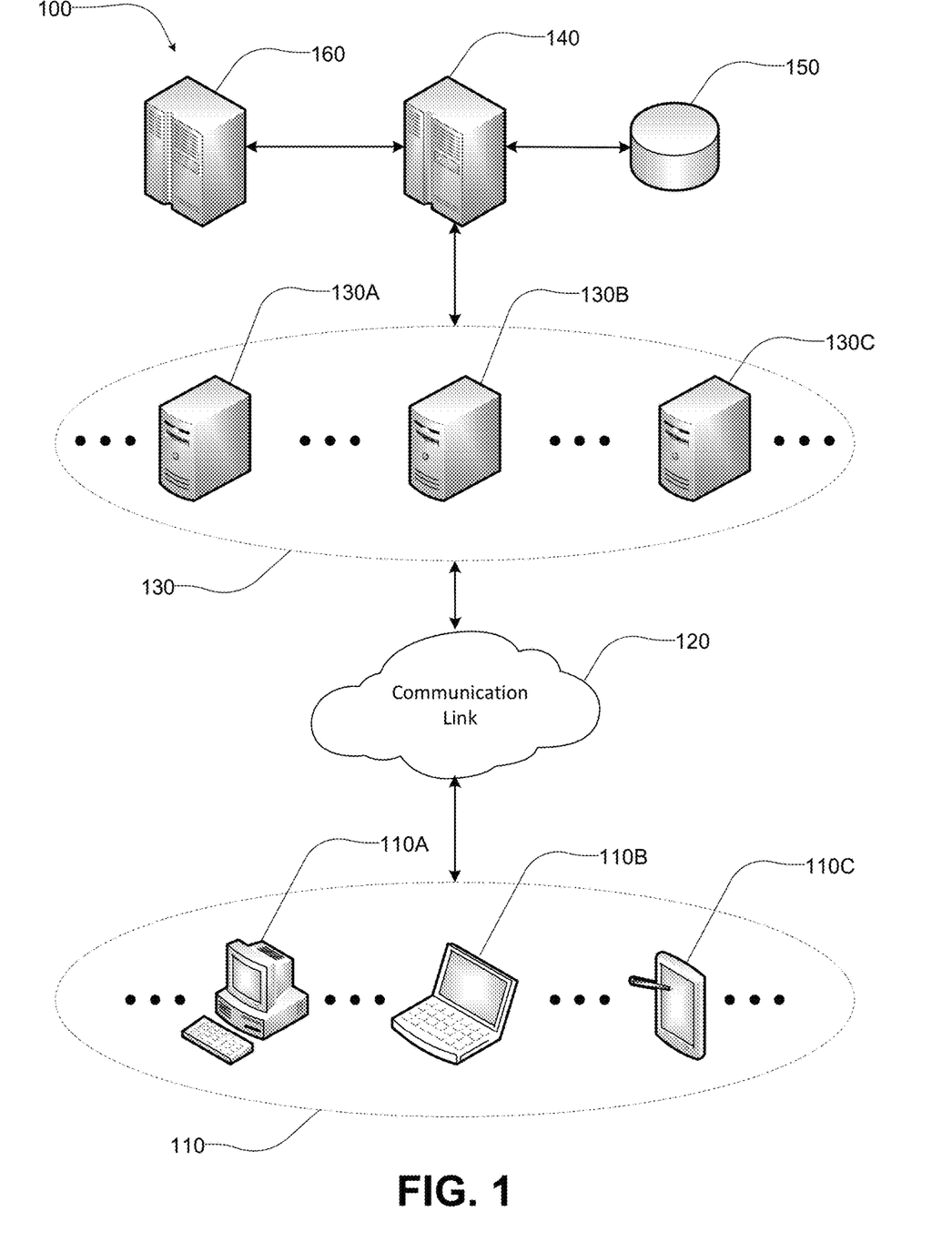
FIG. 1 illustrates an implementation of a system for identifying visual accessibility violations (VAVs).

FIG. 1 illustrates an implementation of a system 100 for identifying VAVs occurring at any of a plurality of user devices or clients 110. The system 100 may include the user devices or clients 110, a plurality of service host devices or hosts 130, management server 140, data storage 150, an artificial intelligence (AI)/machine learning (ML) engine 160, and/or the like.

Each client 110 may be representative of any physical or virtual computing system, device, or collection thereof, such as a desktop computer 110A, laptop computer 110B, tablet computer 110C, smart phone, hybrid computer, gaming machine, smart television, entertainment device, Internet appliance, virtual machine, wearable computer, as well as any variation or combination thereof. The clients 110 may operate remotely from the hosts 130, and hence may communicate with each other by way of data and information exchanged over a suitable communication link or links 120. Each client 110 may implement some of or all the functions for identifying VAVs. For example, each client 110 may be configured to perform functions of identifying the brightness or luminosity of each color used in the GUI and passing information containing the identified colors to the host 130, management server 130, the AI/ML engine 160, and/or the like. The VAV detection, reporting, etc. may be performed by other parts of the system 100, for example, the host 130, management server 130, the AI/ML engine 160, and/or the like. This approach may allow the clients 110 to be implemented with a simpler operating algorithm, which requires less processing power and resources. The clients 110 may also include or be in communication with the management server 140, data storage 150, AI/DL engine 160, and/or the like.

The clients 110 may operate a local service (not shown) for communication and collaboration, which may be configured to allow a user to initiate or participate in a communication/collaboration session (CCS), such as, text chat, audio chat, video chat, teleconference, tele-presentation, etc. Such local service may be any software application, module, component, or collection thereof, capable of receiving communication data (e.g., text data, audio data, video data, presentation data, conference data, etc.) originated from other clients 110 and hosts 130. The local service may operate as part of a communication, collaboration and/or productivity solution (e.g., Microsoft™ Office™, Microsoft™Office365™, Google™ Workspace™, Apple™ iWork™) for creating content (e.g., documents, charts, presentations, conference content, visual content, webpages, reports, resumes, etc.), communicating and collaborating with other users (e.g., text chats, voice chats, video chat, multimedia chats, etc.), and/or the like. The clients 110 may include or be connected to a display (not shown), which may display a graphical user interface (GUI) for the communication/collaboration application or communication, collaboration and/or productivity solution. The local service may also be configured to allow the users to initiate and participate in the CCS via a web browser (e.g., Microsoft™ Edge™, Google™ Chrome™, Apple™ Safari™, etc.)

In an implementation, the local service may be implemented as a locally installed and executed application, streamed application, mobile application, web application, web browser, or any combination or variation thereof, which may be configured to perform operations or functions related to allowing the users to initiate or participate in a CCS and customize a GUI color theme, identifying and reporting a VAV, etc. Alternatively, the local service may be implemented as part of an operating system (OS), such as Microsoft™ Windows™, Apple™ iOS™, Linux™, Google™ Chrome OS™, etc. The local service may be implemented as a standalone application or may be distributed across multiple applications.

The hosts 130 and management server 140 may be representative of any physical or virtual computing system, device, or collection thereof, such as, a web server, rack server, blade server, virtual machine server, or tower server, as well as any other type of computing system, which may, in some scenarios, be implemented in a data center, a virtual data center, or some other suitable facility.

The hosts 130 may operate a host service (not shown), which may implement all or portions of the functions for supporting the clients 110 for initiating and participating in a CCS. The host service may host, be integrated with, or be in communication with various data sources and processing resources, such as, the management server 140, one or more data storages (e.g., data storage 150, etc.), one or more AI/DL engines (e.g., AI/DL engine 160, etc.), and/or the like. The host service may be any software application, module, component, or collection thereof capable of allowing the users of the clients 110 to initiate and participate in a CCS.

In an implementation, the hosts 130 may be platform hosts configured to support different platforms, respectively. For example, the hosts 130 may include an application host 130A, web host 130B, mobile host 130C, etc. The application host 130A may be configured to support one or more clients 110 that use a local application to participate in the CCS. For example, the desktop compute 110A, which runs a local application, may be connected to the application host 130A. The web host 130B may be configured to support one or more clients 110 that participate in the CCS via a web browser. For example, the laptop computer 120A, running a web browser to access the CCS, may be connected to the web host 130B. The mobile host 130C may be configured to support one or more clients 110 that use a mobile application to participate in the CCS. For example, the mobile device 110C that runs a mobile application to access the CCS may be connected to the mobile host 130C. The hosts 130A, 130B and 130C may communicate with each other to direct communication data (e.g., text data, media data, etc.) from one client to another.

In another implementation, the hosts 130 may be application hosts for different applications, respectively. Each host 130 may be connected to the clients 130 and support the local application, web-based access, mobile application and/or the like operating at the clients 130 for a particular application. For example, the host 130A may be a CCS application host (e.g., a chat application, conference application, telepresence application, etc.) that supports the local CCS application, mobile CCS application, web-based CCS access, and/or the like. The host 130B may be another application host for a productivity application (e.g., word processing application, spreadsheet application, presentation application, content creation application, etc.), of which a function can be embedded into the CCS application. For example, the CCS application host 130A may control the clients 110 to render a GUI for a CCS such that the users of the clients 110 may communicate and collaborate via the CCS GUI rendered at their respective clients 110. During the CCS, one user of the desktop client 110A may want to use a function of the productivity application during the CCS to create or share external content, for example, a chart, table, etc., which needs to be shown on the CCS GUI rendered at other clients 130 of different platforms. To achieve this, the productivity application host 130B may be in communication with the CCS application host 130A to enable the external content is seamlessly rendered at the different GUI of the clients 110, for example, the desktop CCS application GUI rendered at the desktop client 110A, the web-based CCI GUI rendered at the laptop client 110B, and the mobile CCS application GUI rendered at the mobile client 110C.

The features and functionality provided by the local service on the clients 110 and host service on the hosts 130 may be co-located or even integrated as a single application. In addition to the above-mentioned features and functionality available across application and service platforms, aspects of the VAV identification and reporting may be performed across multiple devices on a same or different computing devices. For example, some functionality may be provided by the local service on the client 110 and the local service may communicate by way of data and information exchanged between other clients 110 and the hosts 130. As another example, the clients 110 may operate as a so-called "thin client" in a virtual computing environment and receive video data that is to be displayed via their display. In this virtual computing scenario, the host 130 may perform identifying and reporting VAVs.

The management server 140 may perform management and data sharing service among the hosts 130 such that the CCS performed via the multiple hosts 130 is seamlessly performed in real time. The management server 140 may be in communication with the clients 110 and/or hosts 130 and receive, from the clients 110 and/or hosts 130, VAV reports and monitor how many clients 110 and/or on-going CCSs are affected by such violation. When such VAV occurs at a predetermined frequency and/or a certain number or percentage of the clients 110 and/or CCSs are affected by such violation, the management server 140 may generate an alert to notify a developer or developers, who may in turn review the VAV reports and address the VAV. For example, the management server 140 may generate a VAV report including the details about the VAV, such as the colors causing the VAV and the contrast ratio between the colors, which may help the developers quickly identify and address the issues.

The management server 120 may include or be in communication with the data storages 150, AI/ML engine 160 and/or the like. The AI/ML engine 160 may be implemented based on a machine-learning, which generally involves various algorithms that can automatically learn over time. The foundation of these algorithms is generally built on mathematics and statistics that can be employed to predict events, classify entities, diagnose problems, and model function approximations. As an example, the AI/ML engine 160 may be trained to analyze the VAV reports, determine a VAV frequency, a magnitude of VAV impact, generate an VAV alert based on a set of visual accessibility rules stored in, for example, the data storage 150, etc. The AI/ML engine 160 may also be trained to generate a solution to a VAV, which may be sent to the host 130 associated with the VAV for modifying a color theme enforced by such host.

The AI/ML engine 160 may operate a training system that includes an initial ML model or ML model trainer configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer may be configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced. The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Figure 2A:
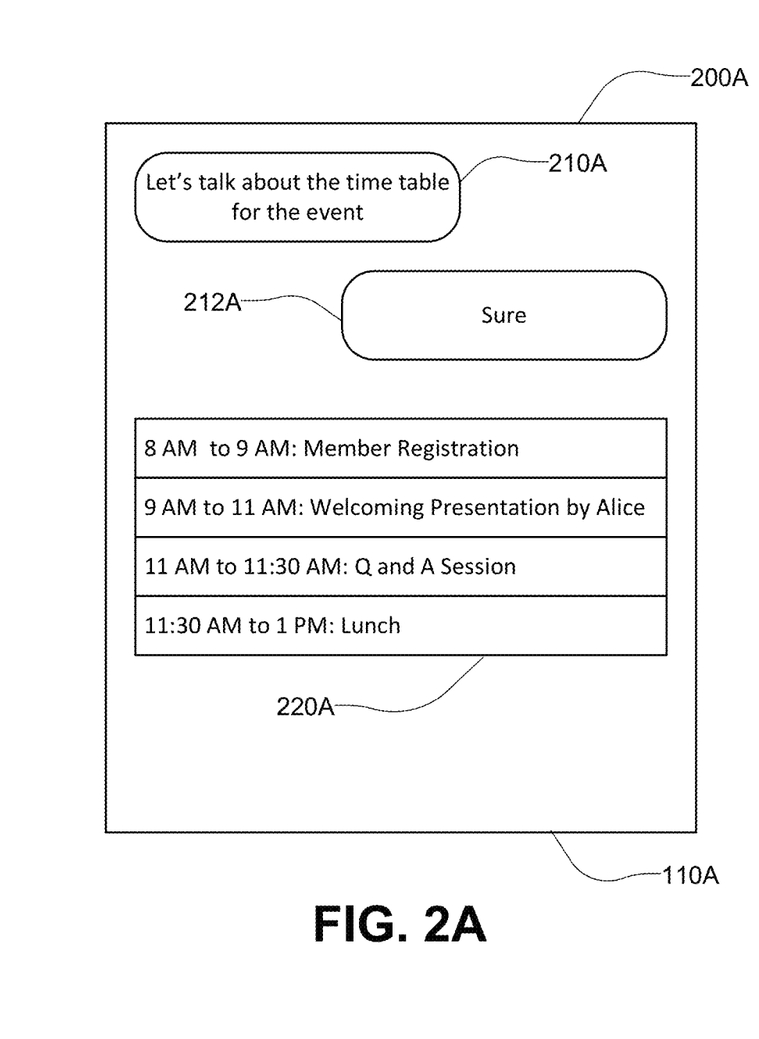
FIGS. 2A and 2B respectively illustrate two communication/collaboration session (CCS) graphical user interfaces (GUIs) respectively rendered on two different clients.
Figure 2B:
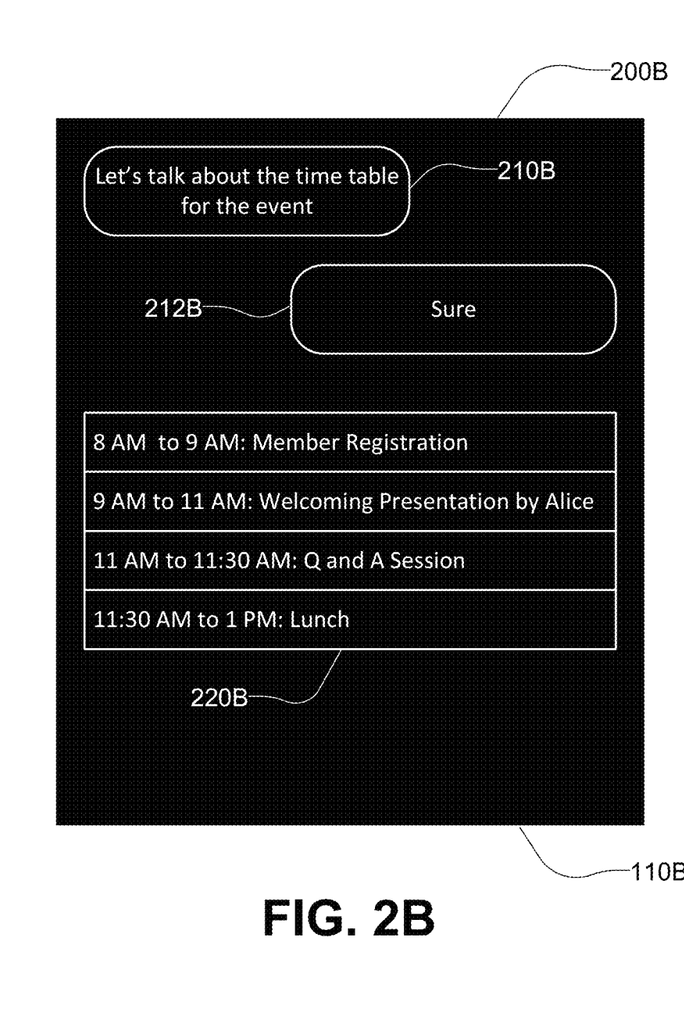

FIGS. 2A and 2B illustrate two GUIs 200A and 200B respectively rendered on two different clients 110 for a CCS between the users of two different clients 110. For example, when the hosts 130 are the platform hosts, the GUI 200A shown in FIG. 2A may be rendered at an application running on the desktop client 110A, which may be in communication with the application host 130A to conduct the CCS. To ensure visual clarity, the application host 130A may issue and enforce theming rules to the clients connected to the application host 130A, including the desktop client 110A. For example, the application host 130A may transmit, to the desktop client 110A, theming data that defines colors for visual elements (e.g., background, text, line, shape, etc.) displayed on the GUI 200A, for example, white for the GUI background, black for the text and lines, etc. Based on the theming data received from the application host 130A, the desktop client 110A may render the visual elements displayed on the GUI 200A, such as a background, texts, lines, shapes, etc. For example, as shown in FIG. 2A, the desktop client 110A may render the GUI 200A to have a white GUI background, white background and black texts and boundary lines for chat bubbles 210A and 212A, white background and black texts and table lines for a table 220A.

When the hosts 130 are the application hosts respectively supporting different applications, one of the hosts 130 may receive the theming data from another. For example, as described above, the host 130A may be the CCS application host that supports the clients 110 to render the CCS GUI 200A and 200B shown in FIGS. 2A and 2B. The host 130B may be the productivity host (e.g., spreadsheet application) that supports productivity-related functions (e.g., creating and sharing a table or chart), which are external to the functionality offered by the CCS application host 130A. During the CCS, the user of the client 110A may activate such an external function, for example, creating and sharing the table 220A with other users of the clients 110, which is supported by the productive application host 130B. The productivity application host 130B may then communicate with the CCS application host 130A to receive theming data defining colors for rendering the table 220A on the different GUIs with different color themes. Based on the received theming data, the productivity application host 130B may control the clients 110A and 110B to render the tables 220A and 220B on the GUIs 200A and 200B, respectively. For example, the productivity application host 130B may control the client 110A to render the table 220A to have a white background and black texts and lines on the GUI 200A, and control the client 110B to render the table 220B to have a black background and white texts and lines on the GUI 200B. As such, the application hosts 130 may communicate with each other to provide and obtain theming data for rendering an external component displayed on GUIs of the clients 110 that may have different color themes.

The system 100 may be configured to monitor whether there are any VAV issues on the GUIs rendered at the clients 110. For example, when the hosts 130 are the platform hosts, the desktop client 110A may check if there are any VAV issues with the visual elements displayed on the GUI 200A. In an implementation, the desktop client 110A may configured to determine a contrast ratio (CR) between the graphical elements displayed on the GUI 200A. The CR is defined as a ratio of a brightness or luminosity of the brightest shade to that of the darkest shade displayed on a screen. For example, a CR of 1000:1 means that the brightness or luminosity of a completely white image is 1000 times greater than the brightness of a completely black image. A higher CR produces images with more saturated colors since the difference between black and white is greater. When a graphical element (e.g., text or line) has a lower CR with respect another graphical element (e.g., background), users are likely to find it difficult to distinguish the two visual elements, which may be regarded as a VAV. The desktop client 110A may then compare the CR with a predetermined CR threshold (e.g., 400:1, 900:1, etc.). The predetermined CR threshold may be set based on statistical experiments and researches, user's vision, user preferences, and/or the like. For example, when the desktop client 110A is being used by a visually impaired user, an exceedingly high CR threshold (e.g., 900:1) may be enforced. On the other hand, a user with a healthy vision might not have any problem even when the GUI is rendered with a relatively low contrast color theme (e.g., 400:1). When the predetermined CR threshold is 800:1 and the CR between the white background and black texts and lines displayed on the GUI 200A is 1000:1, the desktop client 100A may determine that there are no VAV issues.

The GUI 200B shown in FIG. 2B may be rendered on, for example, on a web-browser running on the laptop client 110B, which may be in communication with the web host 130B to conduct the CCS with the desktop client 110A. The color theme of the GUI 200B may be configured to be the same as that of the GUI 200A shown in FIG. 2A, and the web host 110B may transmit, to the laptop client 110B, theming data that enforces the same or similar color theme for the GUI 200B. Alternatively, the web host 130A may enforce a different color theme for the GUI 200B, or the color theme of the GUI 200B may be user-customizable. For example, as shown in FIG. 2B, the user may turn on a dark mode for the GUI 200B. In such situation, the web host 130B may issue theming data enforcing a different color theme, for example, black for the GUI background and white for texts, lines and shapes.

When a new visual element (e.g., a text, line, shapes, etc.) is displayed on the GUI 200B, the laptop client 110B may render the new visual element based on the color theme enforced by the web host 130B, which may be different from the color theme enforced by another host, such as the desktop host 110A. For example, when the web GUI 200B is rendered in the dark mode, the chat bubbles 210B and 212B rendered on the GUI 200B may have a black background and white texts and lines, which are different from the white background and black texts and lines used for the chat bubble 210A and 212A rendered on the app GUI 200A shown in FIG. 2B. As such, the web host 130 may be configured to ensure a sufficient visual contrast among the visual elements rendered on the GUI 200B. Also, the laptop client 110B may determine a CR among the theme colors and compare the CR with a predetermined CR threshold. In FIG. 2B, the white and black theme colors have 100% CR, which would pass a VAV issue test as long the predetermined threshold is set to be less than 100%.

While the hosts 130 are configured to ensure that the color themes generated and enforced by the hosts 130 provide sufficient readability of the GUIs rendered on the clients 110, some of the enforced color themes may include, due to a coding error or the like, a bug that may cause a VAV. Such bug may occur rarely but, when they do, may render some of visual elements on GUIs invisible or difficult to distinguish from other visual elements.

Such VAV issues may be detected by the hosts 130. For example, as described above, the hosts 130 may be the application hosts, including the CCS application host (e.g., chat application host) 130A and the productive application host (e.g., spreadsheet application) 130B. During a CCS, the productive application host 130B may be called upon to support creating and sharing an external component (e.g., table 220A) on the GUIs (e.g., GUIs 200A and 200B) of the different clients 110 (e.g., clients 110A and 110B). The productivity application host 130B may then communicate with the CCS application host 130A to receive the theming data defining colors for rendering the external component on the GUIs of the clients 110. In doing so, the productivity application host 130B may determine whether the color theme received from the CCS application host 130A may cause a VAV at any of the clients 110 based on, for example, CRs among the colors used for rendering each GUI and the colors used for the external component rendered on the GUI.

Figure 3A:
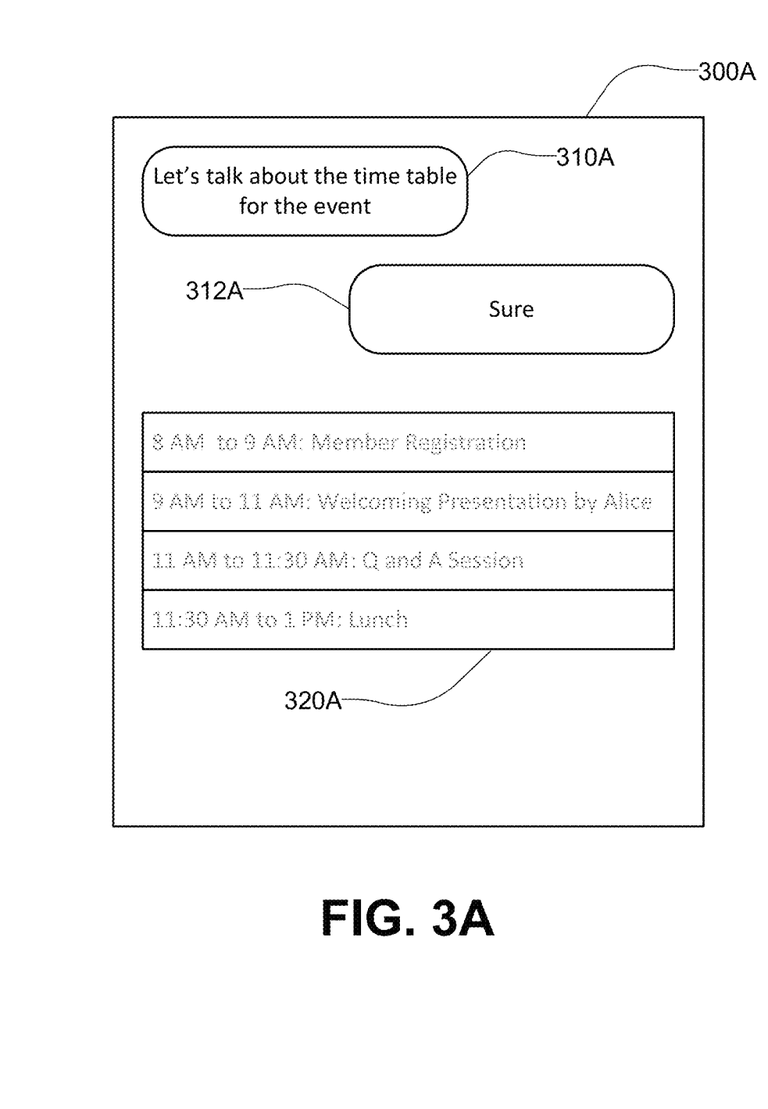
FIGS. 3A and 3B respectively illustrate two CCS GUIs respectively rendered on clients and affected by VAVs.
Figure 3B:
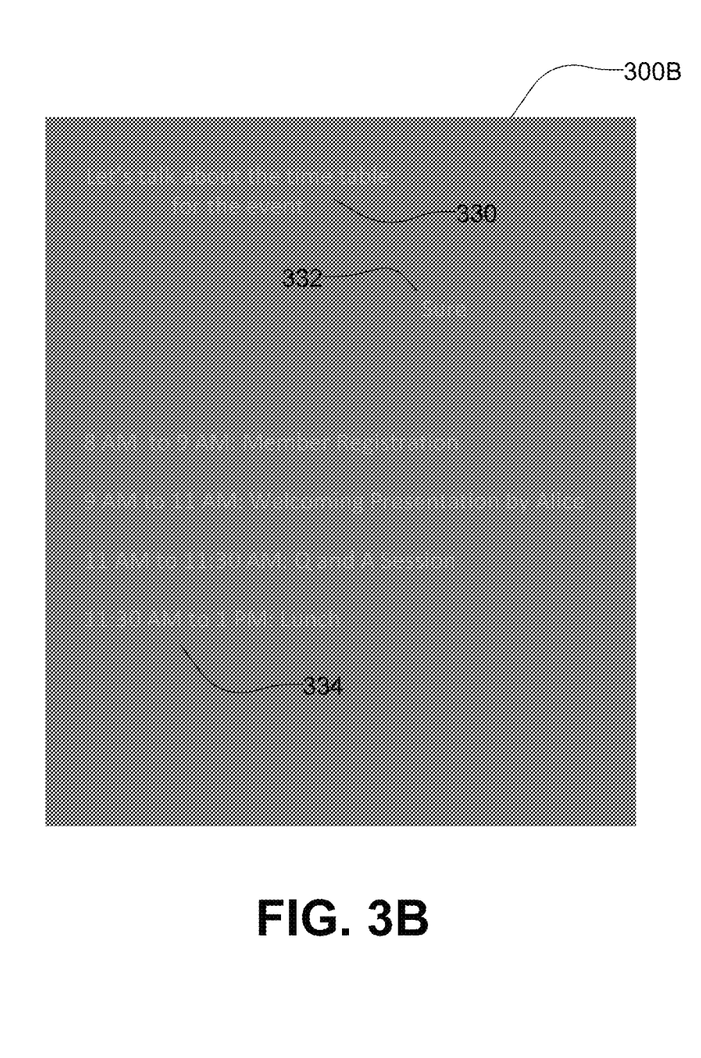
Figure 4A:
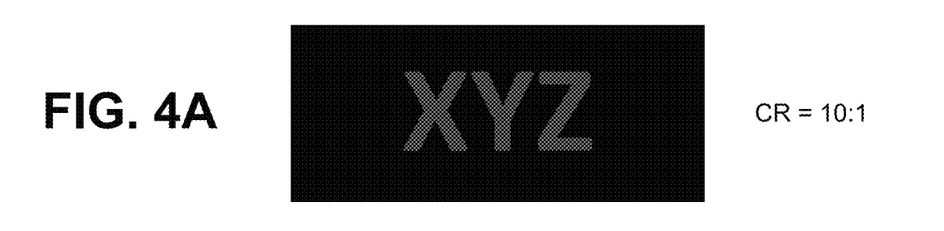
FIGS. 4A to 4E illustrate examples of contrast ratios between the same background color and five different visual element colors.
Figure 4B:
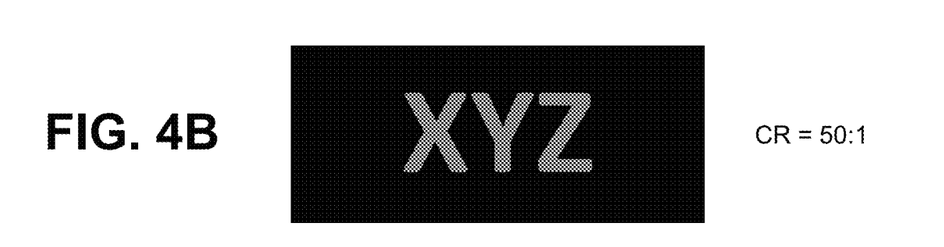
Figure 4C:
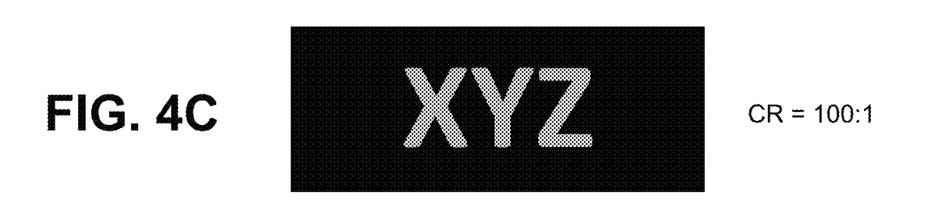
Figure 4D:
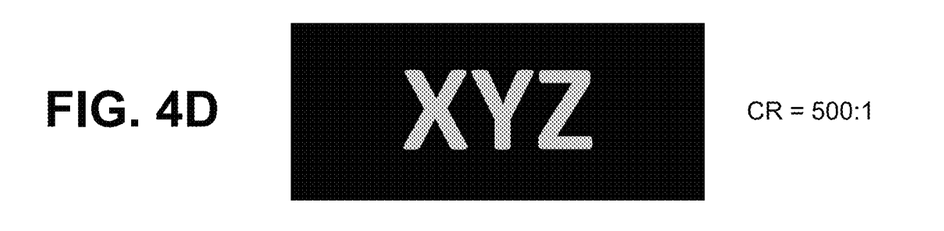
Figure 4E:
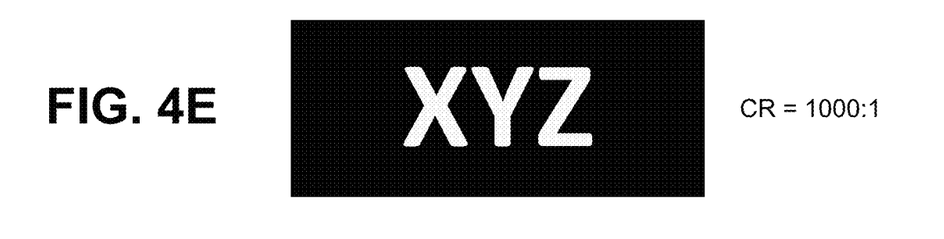
Figure 5A:
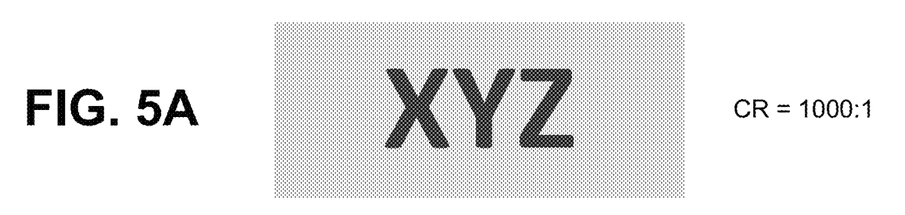
FIGS. 5A to 5E illustrate additional examples of contrast ratios between the same background color and five different shades of the same color used for the visual element displayed on the background.
Figure 5B:
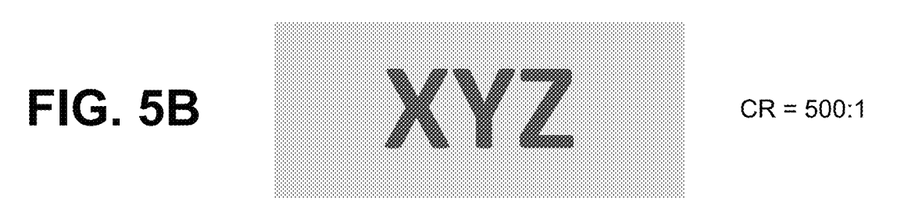
Figure 5C:
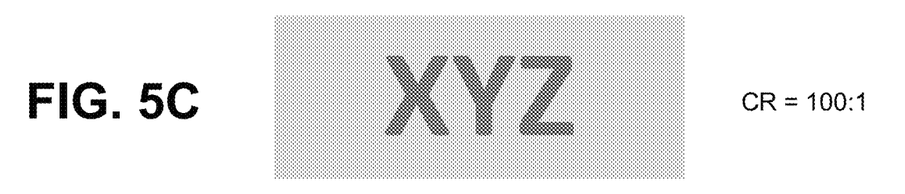
Figure 5D:
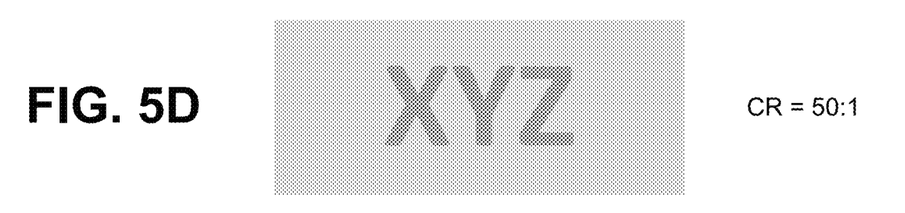
Figure 5E:
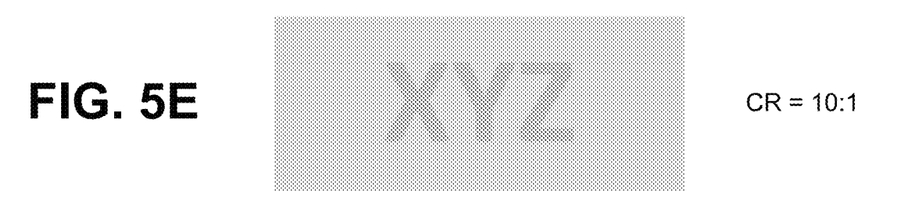

FIGS. 3A and 3B respectively illustrate two CCS GUIs 300A and 300B rendered on the clients 110 and affected by VAVs. For example, when the hosts 130 are the platform hosts, the GUI 300A is rendered at the mobile client 110C, which is in communication with the mobile host 130C. The mobile client 110C may be used to participate in the CCS with the users of the clients 110A and 110B, and may render the CCS GUI 300A based on the color theme enforced by the mobile host 130C. The mobile theme applied to the GUI 300A may include a bug due to a coding error or the like, which may result in the text in a table 320A is displayed in light gray while other texts in chat bubbles 310A and 312A are displayed in black. When the white background is used in the GUI 300A, the gray text in the table 320A might not be sufficiently distinguishable from the white background of the GUI 200A, thereby causing a VAV. Such VAV may occur more frequently when a GUI is rendered with unusual color theme. For example, as shown in FIG. 3B, when the user of the mobile client 110C customizes the color theme for the GUI 300B to have a lower contrast color theme, unforeseeable VAVs may occur, which would not occur if a higher contrast color theme were used for the GUI 300B. Such VAVs may include, as shown in FIG. 3B, the lines of chat bubbles and table being rendered with the same color as the background, thereby disappearing from the GUI 300B. Also, the texts 330, 332 and 334 of the chat bubbles and table may be rendered with a color that is not clearly distinguishable from the background of the GUI 300B.

Since there are virtually an unlimited number of color combinations for GUI color themes, it is difficult or impossible to evaluate, test and validate each color theme prior to the hosts 130 enforcing the color themes to the clients 110. Also, once the hosts 130 issue color themes to the clients 110, it is difficult to detect whether any of the issued GUI color themes causes a VAV especially when only a small number of the clients 110 are affected by such VAV. To solve these technical problems, the clients 110 may be configured to detect whether a VAV occurs and report the VAV, which may be collected and analyzed by the hosts 130, management server 140, the AI/DL engine 160 and/or the like.

Such VAV issues and/or VAV reports may be detected and generated by the hosts 130. For example, as described above, the hosts 130 may be the application hosts, which include the CCS application host 130A (e.g., a chat application host) and the productive application host 130B (e.g., a spreadsheet application host). The CCS application host 130A may support and control the mobile client 130C to render the CCS GUI 300A in the color theme enforced by the host 130A. When any of the users of the clients 110 wishes to create and share an external component (e.g., a table), the productivity application host 130B may called upon to support creation and sharing of the external component. The productivity application host 130B may then communicate with the CCS application host 130A to receive the theming data defining the colors for rendering the external component on the GUIs of the clients 110. The productivity application host 130B may then check whether the received theming data would result in a VAV when the external component is rendered on any of the GUIs of the clients 110. For example, as shown in FIG. 3A, the productivity application host 130B may detect that the received theming data would result in rendering the texts in the table 320A in gray, which has a low CR with the white background rendered on the GUI 300A of the mobile client 110C. Also, as shown in FIG. 3B, the productivity application host 130B may detect that the received theming data would result in rendering the lines in gray, which is the same or similar to the gray background of the GUI 300B. Upon detecting such VAV issues, the host 130B generate VAV reports, which may include the VAV details.

When such VAV occurs at a predetermined frequency or a predetermined number or percentage of the clients 110 are affected by the same VAV, the system 100 may generate an alert to notify developers such that an action may be taken to address the VAV issue. For example, based on the analysis of the collected reports, the system 100 may determine that the color theme enforced by the mobile host 130A contains a bug that causes a VAV in the GUI 300A or 300B rendered at the mobile client 110C. When the hosts 130 are the platform hosts, the system 100 may then control or instruct the mobile host 130C to modify or prohibit the color theme such that the VAV does not affect the GUI 300A or 300B of the mobile client 130C. Additionally or alternatively, the system 100 may instruct the mobile client 130C to prohibit the low contrast GUI color theme, or have the AI/DL engine 160 to develop a new color theme for the mobile host 130C to eliminate the detected VAV. Hence, it may be become possible to detect the VAV issues immediately and address the issue before a large portion of the clients are affected, thereby providing the technical solutions to the technical problems. When the hosts 130 are the application hosts, the system 100 may control or instruct the CSI application host 130A to modify the theming data or prohibit the color theme such that the VAV does not occur at any of the clients 110. The system 100 may also prohibit the mobile client 130C to prohibit the low contrast GUI color theme, or have the AI/DL engine 160 to develop a new color theme for the mobile host 130C to eliminate the detected VAV.

FIGS. 4A to 4E illustrate examples of five CRs between the same background color and five different visual element colors, which are 10:1, 50:1, 100:1, 500:1 and 1000:1, respectively. When the predetermined CR threshold is set to 400:1 and the visual element color (e.g., the color of the text "XYZ") and the background colors have a CR less than 400:1, the system 100 may determine that a VAV has occurred. Hence, the color themes shown in FIGS. 4A, 4B and 4C may be determined to have a VAV. When the predetermined CR threshold is set to 700:1, the color themes shown in FIGS. 4A, 4B, 4C and 4D may be determined to have a VAV.

FIGS. 5A to 5E illustrate additional examples of CRs between the same background color (e.g., yellow) and five different shades of the same color (e.g., blue) used for the text, which are 1000:1, 500:1, 100:1, 50:1 and 10:1 respectively. When the predetermined CR threshold is set to 400:1 and the visual element color (e.g., the color of the text "XYZ") and the color scheme has a CR that is less than 400:1, the system 100 (e.g., client 110) may determine that a VAV has occurred. Hence, the color themes shown in FIGS. 5C, 5D and 5E may be determined to have a VAV. When the predetermined CR threshold is set to 800:1, the color themes shown in FIGS. 5B, 5C, 5D and 5D may be determined to have a VAV.

Figure 6:
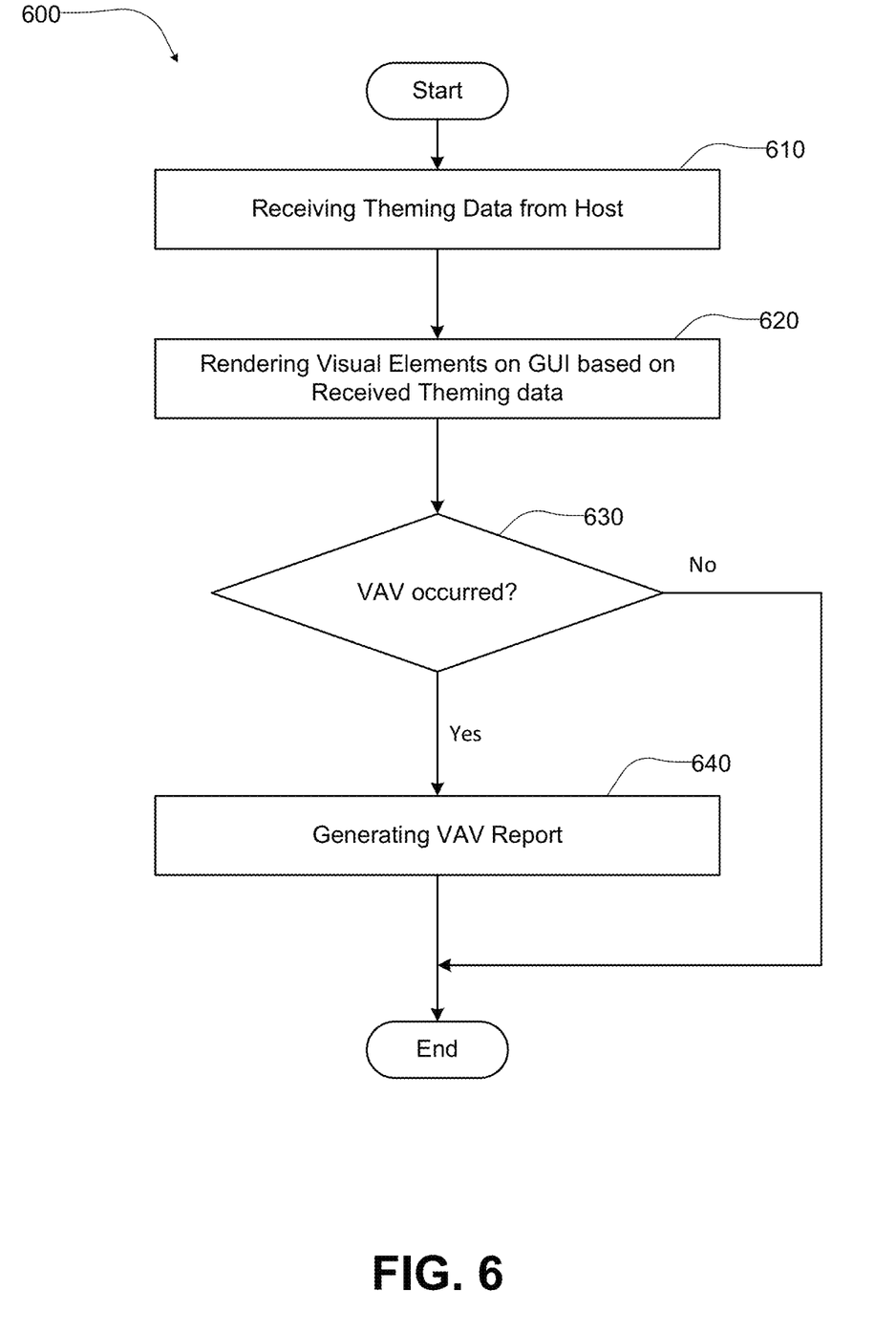
FIG. 6 illustrates a flow diagram showing an example process for identifying a VAV on a GUI rendered based on a color theme enforced by the host 130.

FIG. 6 illustrates a flow diagram showing an example process 600 for identifying a VAV on a GUI rendered based on a color theme enforced by a host. The process 600 may be performed by the system 100, for example, the client 110, host 130, management server 140, AI/DL engine 160, and/or the like. In an implementation, when the hosts 130 are the platform hosts, the process 600 may be performed by the client 110. Upon starting the process 600, the client 110 may receive theming data from the host 130 at step 610. The theming data may define colors for various visual elements (e.g., background, text, line, shape, etc.) of a GUI rendered at the client 110. At step 620, the client 110 may render the visual elements on the GUI based on the received theming data. Then, at step 630, the client 110 may determine whether any of the visual elements displayed on the GUI causes a VAV with respect to other visual elements. When no VAV occurs (No at step 630), the process 600 may terminate. However, when a VAV is detected (Yes at step 630), the client 110 may generate a VAV report at step 640, which may include an identification of the host 130 that provided the theming data, an identification of the CCS, details of the VAV, time and date of the VAV, etc. Such VAV report may be transmitted to the host 130, management server 140, the AI/DL engine 160, and/or the like.

When the hosts 130 are the application hosts, the process 600 may be performed by the host 130, for example, the productivity application host 130B. Upon starting the process 600, the productivity application host 130B may receive theming data from the CCS application host 130A at step 610. At step 620, the productivity application host 130B may cause the client 110 (e.g., mobile client 110C) to render the visual element (e.g., table 320A shown in FIG. 3A) on the GUI based on the theming data received from the CCS application host 130A. Then, at step 630, the productivity application host 130B may determine whether the visual element on the GUI causes a VAV with respect to other visual elements on the GUI. When no VAV occurs (No at step 630), the process 600 may terminate. However, when a VAV is detected (Yes at step 630), the productivity application host 130B may generate a VAV report at step 640, which may include an identification of the CCS application host 130A that provided the theming data, an identification of the CCS, details of the VAV, time and date of the VAV, etc. Such VAV report may be transmitted to the management server 140, the AI/DL engine 160, and/or the like.

Figure 7:
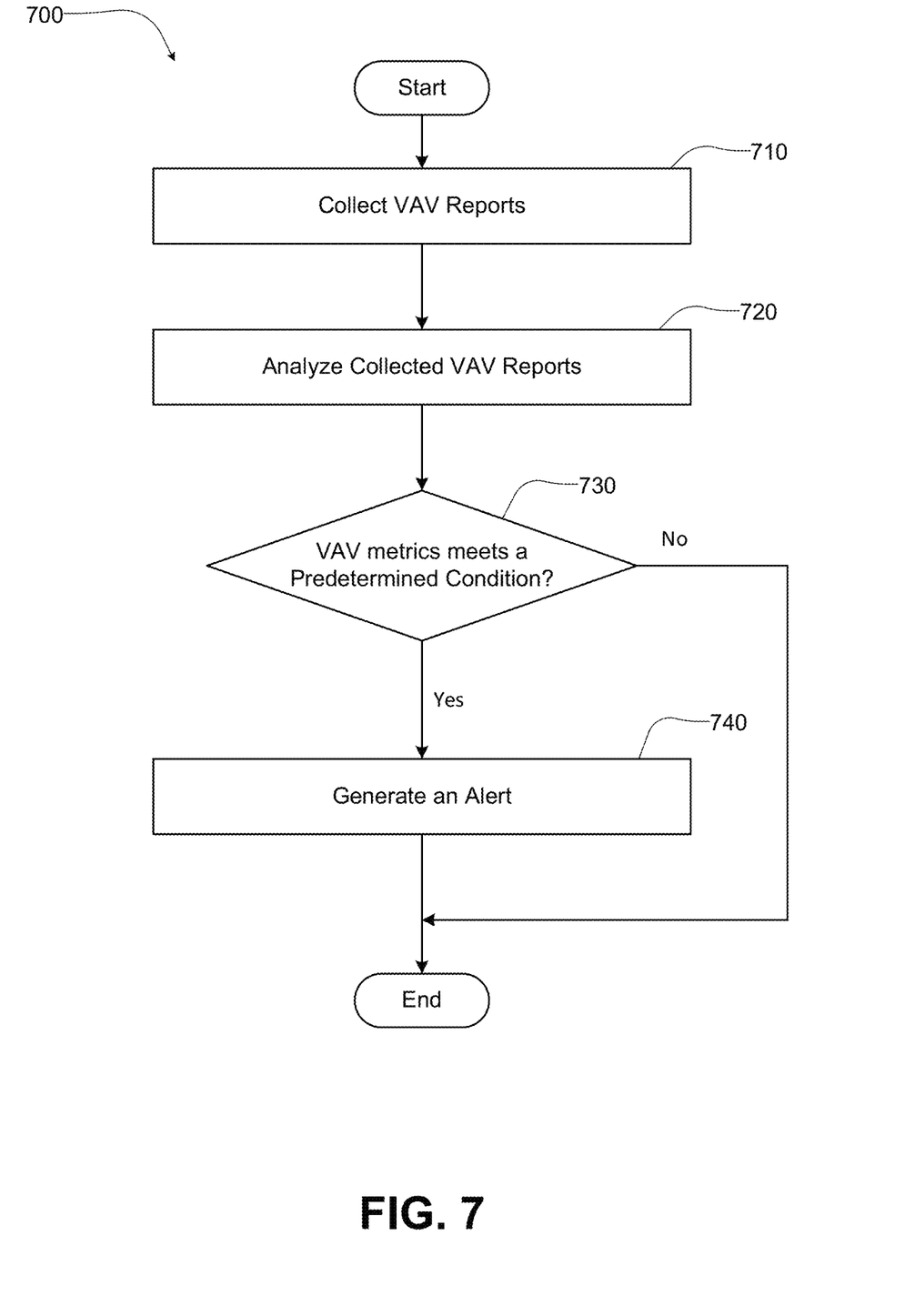
FIG. 7 illustrates a flow diagram showing an example process for generating an alert based on collected VAV reports.

FIG. 7 illustrates a flow diagram showing an example process 700 for generating an alert based on VAV reports collected from, for example, the clients 110 or hosts 130. Each VAV report may be generated by the clients 110 or hosts 130 using the process 600 shown in FIG. 6, and may be stored at, for example, the data storage 150. Upon starting the process 700, the VAV reports generated by the clients 110 or hosts 130 may be collected by, for example, the management server 140 at step 710. At step 720, the management server 140 may analyze the collected VAV reports to determine characteristics of a particular VAV, such as a frequently of the VAV occurrences, the host 130 that generated the color theme associated with the VAV, a number of the clients 110 affected by the VAV, a percentage of the clients 110 affected by the VAV, and/or the like. The VAV collection at step 710 and the VAV report analysis at step 720 may be performed continuously in real time or periodically (e.g., every hour, every day, every week, etc.). Then, at step 730, the management server 140 may determine whether the VAV metrics meet a predetermined condition, which may include, for example, determining whether the detected VAV occurrences exceeds a frequency threshold, determining whether the detected VAV occurrences exceeds an affected CCS number threshold (e.g., 10 VAV occurrences per week), determining whether a number of the affected client exceeds a client number threshold (e.g., 5 affected clients per day), determining whether a percentage of the affected clients exceeds a client percentage threshold (e.g., 3% of the entire clients), and/or the like. When the VAV metrics do not meet the predetermined condition (No at step 730), the process 700 may terminate. When the VAV metrics meet the predetermined condition (Yes at step 730), the management server 140 may generate an alert to notify an IT personnel or developer of the VAV at step 740. The alert may include details on the VAV, including, for example, the frequently of the VAV occurrences, the host 130 that generated the color theme associated with the VAV, the number of the clients 110 affected by the VAV, the percentage of the clients 110 affected by the VAV, and/or the like. This may allow the IT personnel or developer to quickly take an action to alleviate or eliminate the VAV before the VAV affects more clients and CCSB. For example, the developer may review the theming data enforced by the host 130 and perform debugging such that the VAV does not occur anymore. Upon generating the alert at step 740, the process 700 may terminate.

Alternatively or additionally, the management server 140 may provide the VAV metrics to the AI/DL engine 160, which may be trained to identify bugs in the theming data and perform debugging. The debugged data may be extracted from the AI/DL engine 160 and provided to the host 130. The debugged theming data may include a new color theme that does not allow a certain color or colors to be used for displaying a visual element of a GUI.

Figure 8:
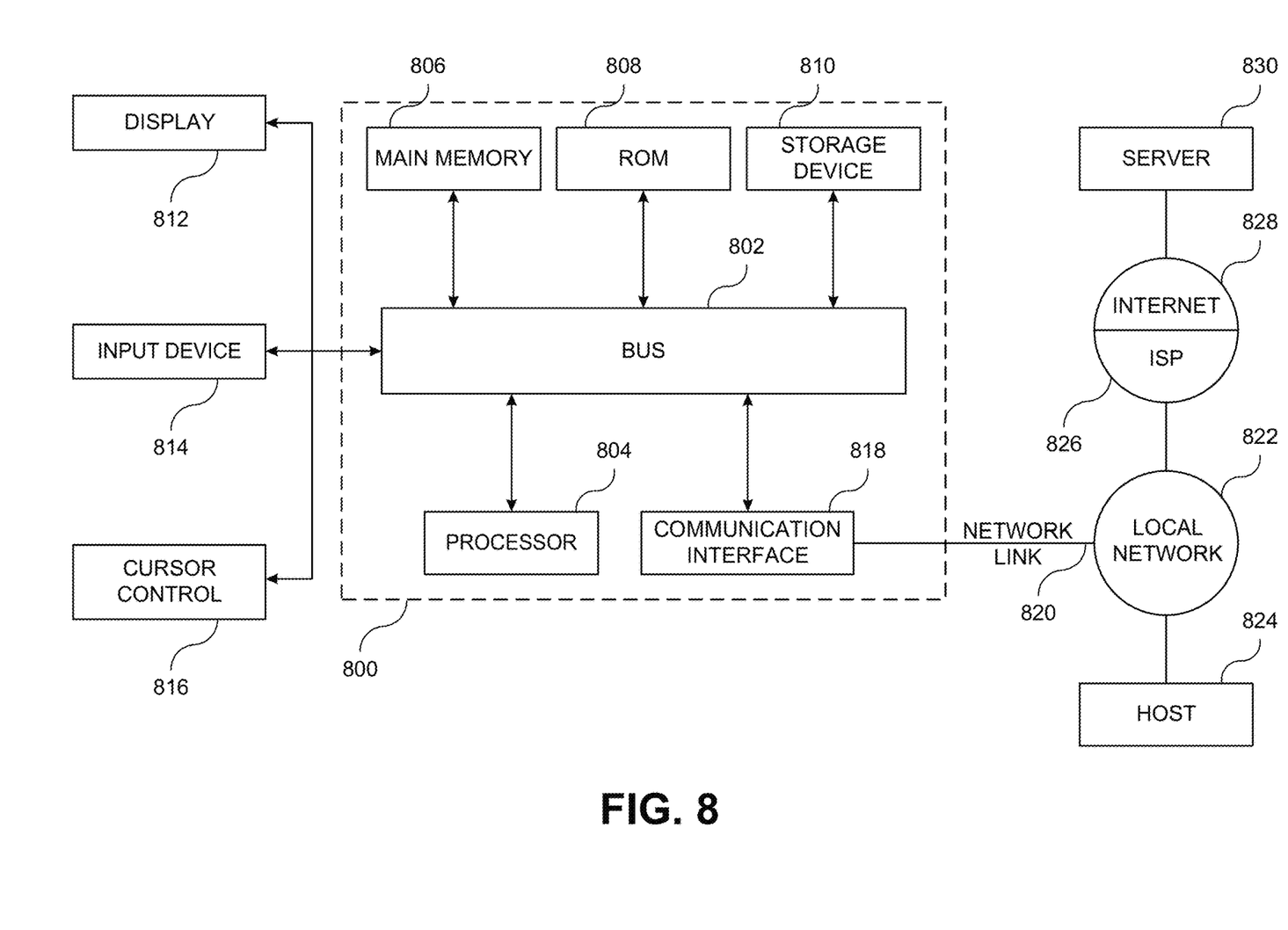
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the clients 110, hosts 130 and management server 140.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for detecting a visual accessibility violation (VAV), comprising:
    a processor; and
    a computer-readable medium in communication with the processor, the computer-readable medium comprising instructions that, when executed by the processor, cause the processor to control the device system to perform:
        transmitting, from a host to a plurality of client devices via a communication network, theming data including a first color theme specifying one or more colors for one or more visual elements of a graphical user interface (GUI), the one or more colors including a first color specified for a first visual element of the GUI, wherein each of the plurality of client devices is configured to perform:
            rendering, based on the theming data transmitted from the host, the GUI showing (1) the first visual element having the first color specified by the first color theme and (2) a second visual element having a second color;
            determining, from the rendered GUI, whether the first and second colors respectively used for the first and second visual elements of the GUI violate a visual accessibility rule; and
            in response to determining that the first and second colors respectively used for the first and second visual elements of the GUI violate the visual accessibility rule, generating a VAV report indicating an occurrence of the VAV;
        providing, to an artificial intelligence (AI) engine, the VAV report from each of the plurality of client devices, the AI engine trained to identify a bug in the first color theme that causes the VAV at the plurality of client devices and debug the theming data transmitted to the plurality of client devices, the debugged theming data including a second color theme prohibiting the first color from being used for the first visual element of the GUI; and
        extracting, from the AI engine, the debugged theming data including the second color theme and providing, to the host, the debugged theming data, the host configured to transmit the debugged theming data to the plurality of client devices.

2. The system of claim 1, wherein the one or more visual elements of the GUI include a background, text, line or shape.

3. The system of claim 1, wherein, for determining whether the first and second colors respectively used for the first and second visual elements of the GUI violate the visual accessibility rule, the instructions, when executed by the processor, further cause the processor to control the system to perform determining whether a contrast ratio between the first and second colors exceeds a predetermined contrast ratio threshold.

4. The system of claim 1, wherein the VAV report generated at each of the plurality of client devices includes at least one of the first color theme, the first and second colors, the host providing the theming data, a communication/collaboration session affected by the VAV, the client device affected by the VAV, and a date and time of the VAV.

5. The system of claim 1, comprising the plurality of client devices and the host.

6. The system of claim 1, wherein the GUI comprises a GUI for a communication/collaboration session.

7. The system of claim 1, wherein the instructions, when executed by the processor, further cause the processor to control the system to perform:
   determining, based on the VAV report from each of the plurality of client devices, whether the VAV meets a predetermined condition; and
   in response to determining that the VAV meets the predetermined condition, generating an alert.

8. The system of claim 7, wherein the predetermined condition includes at least one of:
   a VAV occurrence frequency;
   a number of communication/collaboration sessions affected by the VAV;
   a number of the client devices affected by the VAV; and
   a percentage of the client devices affected by the VAV.

9. A method of operating a system for detecting a visual accessibility violation (VAV), comprising:
   , transmitting, from a host to a plurality of client devices via a communication network, theming data including a first color theme specifying one or more colors for one or more visual elements of a graphical user interface (GUI), the one or more colors including a first color specified for a first visual element of the GUI, wherein each of the plurality of client devices is configured to perform:
      rendering, based on the theming data transmitted from the host, the GUI showing (1) the first visual element having the first color specified by the first color theme and (2) a second visual element having a second color;
      determining whether the first and second colors respectively used for the first and second visual elements of the GUI violate a visual accessibility rule; and
      in response to determining that the first and second colors respectively used for the first and second visual elements of the GUI violate the visual accessibility rule, generating a VAV report indicating an occurrence of the VAV;
   providing, to an artificial intelligence (AI) engine, the VAV report from each of the plurality of client devices, the AI engine trained to identify a bug in the first color theme that causes the VAV at the plurality of client devices and debug the theming data transmitted to the plurality of client devices, the debugged theming data including a second color theme prohibiting the first color from being used for the first visual element of the GUI; and
   extracting, from the AI engine, the debugged theming data including the second color theme and providing, to the host, the debugged theming data, the host configured to transmit the debugged theming data to the plurality of client devices.

10. The method of claim 9, wherein the one or more visual elements of the GUI include a background, text, line or shape.

11. The method of claim 9, wherein determining whether the first and second colors respectively used for the first and second visual elements of the GUI violate the visual accessibility rule includes determining whether a contrast ratio between the first and second colors exceeds a predetermined contrast ratio threshold.

12. The method of claim 9, wherein the VAV report generated at each of the plurality of client devices includes at least one of the first color theme, the first and second colors, the host providing the theming data, a communication/collaboration session affected by the VAV, the client device affected by the VAV, and a date and time of the VAV.

13. The method of claim 9, further comprising:
   determining, based on the VAV report from each of the plurality of client devices, reports, whether the VAV meets a predetermined condition; and
   in response to determining that the VAV meets the predetermined condition, generating an alert.

14. The method of claim 13, wherein the predetermined condition includes at least one of:
   a VAV occurrence frequency;
   a number of communication/collaboration sessions affected by the VAV;
   a number of the client devices affected by the VAV; and
   a percentage of the client devices affected by the VAV.

15. A non-transitory computer-readable medium comprising instructions that, when executed by a processor, cause the processor to control a system for detecting a visual accessibility violation (VAV) to perform:
   , transmitting, from a host to a plurality of client devices via a communication network, theming data including a color theme specifying one or more colors for one or more visual elements of a graphical user interface (GUI), the one or more colors including a first color specified for a first visual element of the GUI, wherein each of the plurality of client devices is configured to perform:
      rendering, based on the theming data transmitted from the host, the GUI showing (1) the first visual element having the first color specified by the first color theme and (2) a second visual element having a second color;
      determining whether the first and second colors respectively used for the first and second visual elements of the GUI violate a visual accessibility rule; and
      in response to determining that the first and second colors respectively used for the first and second visual elements of the GUI violate the visual accessibility rule, generating a VAV report indicating an occurrence of the VAV;
   providing, to an artificial intelligence (AI) engine, the VAV report from each of the plurality of client devices, the AI engine trained to identify a bug in the first color theme that causes the VAV at the plurality of client devices and debug the theming data transmitted to the plurality of client devices, the debugged theming data including a second color theme prohibiting the first color from being used for the first visual element of the GUI; and
   extracting, from the AI engine, the debugged theming data including the second color theme and providing, to the host, the debugged theming data, the host configured to transmit the debugged theming data to the plurality of client devices.

16. The non-transitory computer-readable medium of claim 15, wherein, for determining whether the first and second colors respectively used for the first and second visual elements of the GUI violate the visual accessibility rule includes the instructions, when executed by the processor, further cause the processor to control the system to perform determining whether a contrast ratio between the first and second colors exceeds a predetermined contrast ratio threshold.

* * * * *

UNITED STATES PATENT AND TRADEMARK OFFICE
CERTIFICATE OF CORRECTION

Page 1 of 1

PATENT NO. : 12,148,067 B2
APPLICATION NO. : 17/743916
DATED : November 19, 2024
INVENTOR(S) : Brian Meersma and Omar Prieto Chacon It is certified that error appears in the above-identified patent and that said Letters Patent is hereby corrected as shown below:

On the Title Page

Item (54) and in the Specification Column 1, Lines 1-3, The title "GRAPHICAL USER INTERFACE VISUAL ACCESSIBLITY VIOLATION DETECTION AND ALERTING" is corrected to read "GRAPHICAL USER INTERFACE VISUAL ACCESSIBILITY VIOLATION DETECTION AND ALERTING"

Signed and Sealed this
Twenty-fifth Day of February, 2025

Coke Morgan Stewart
*Acting Director of the United States Patent and Trademark Office*